(12) United States Patent
Murugesh et al.

(10) Patent No.: US 11,007,618 B2
(45) Date of Patent: May 18, 2021

(54) PRINTING CHEMICAL MECHANICAL POLISHING PAD HAVING WINDOW OR CONTROLLED POROSITY

(71) Applicant: Applied Materials, Inc., Santa Clara, CA (US)

(72) Inventors: Laxman Murugesh, San Ramon, CA (US); Kadthala Ramaya Narendmath, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 472 days.

(21) Appl. No.: 15/957,801

(22) Filed: Apr. 19, 2018

(65) Prior Publication Data

US 2018/0236632 A1    Aug. 23, 2018

Related U.S. Application Data

(62) Division of application No. 14/549,443, filed on Nov. 20, 2014, now Pat. No. 9,993,907.

(Continued)

(51) Int. Cl.
*B24B 37/20* (2012.01)
*B29C 71/04* (2006.01)
(Continued)

(52) U.S. Cl.
CPC ............ *B24B 37/205* (2013.01); *B24B 37/24* (2013.01); *B29C 67/20* (2013.01); *B29C 71/04* (2013.01);
(Continued)

(58) Field of Classification Search
CPC .................................................... B24B 37/205
See application file for complete search history.

(56) References Cited

U.S. PATENT DOCUMENTS 5,020,283 A    6/1991 Tuttle
5,387,380 A    2/1995 Cima et al.
(Continued)

FOREIGN PATENT DOCUMENTS

CN    1697139    11/2005
CN    101166604    4/2008
(Continued)

OTHER PUBLICATIONS

International Search Report and Written Opinion in International Application No. PCT/US2013/035513, dated Jun. 25, 2013, 12 pages.

(Continued)

*Primary Examiner* — Larry W Thrower
(74) *Attorney, Agent, or Firm* — Fish & Richardson P.C.

(57) ABSTRACT

A method of fabricating a polishing pad includes determining a desired distribution of voids to be introduced within a polymer matrix of a polishing layer of the polishing pad. Electronic control signals configured to be read by a 3D printer are generated which specify the locations where a polymer matrix precursor is to be deposited, and specify the locations of the desired distribution of voids where no material is to be deposited. A plurality of layers of the polymer matrix corresponding to the plurality of the first locations is successfully deposited with the 3D printer. Each layer of the plurality of layers of polymer matrix is deposited by ejecting a polymer matrix precursor from a nozzle. The polymer matrix precursor is solidified to form a solidified polymer matrix having the desired distribution of voids.

12 Claims, 3 Drawing Sheets

Related U.S. Application Data

(60) Provisional application No. 61/919,578, filed on Dec. 20, 2013.

(51) Int. Cl.

| | | |
|---|---|---|
| *B29C 67/20* | (2006.01) | |
| *B24B 37/24* | (2012.01) | |
| *B29K 75/00* | (2006.01) | |
| *B29K 105/04* | (2006.01) | |
| *B29K 105/00* | (2006.01) | |
| *B33Y 10/00* | (2015.01) | |
| *B33Y 30/00* | (2015.01) | |
| *B33Y 70/00* | (2020.01) | |
| *B33Y 50/02* | (2015.01) | |
| *B29C 35/08* | (2006.01) | |
| *B29C 64/112* | (2017.01) | |

(52) U.S. Cl.
CPC ..... *B29C 64/112* (2017.08); *B29C 2035/0822* (2013.01); *B29C 2035/0827* (2013.01); *B29K 2075/00* (2013.01); *B29K 2105/0032* (2013.01); *B29K 2105/04* (2013.01); *B29K 2995/0026* (2013.01); *B33Y 10/00* (2014.12); *B33Y 30/00* (2014.12); *B33Y 50/02* (2014.12); *B33Y 70/00* (2014.12)

(56) References Cited

U.S. PATENT DOCUMENTS

| | | | |
|---|---|---|---|
| 5,738,574 | A | 5/1998 | Tolles et al. |
| 5,876,490 | A | 3/1999 | Ronay |
| 5,900,164 | A | 5/1999 | Budinger et al. |
| 5,921,855 | A | 7/1999 | Osterheld et al. |
| 5,932,290 | A | 8/1999 | Lombardi et al. |
| 5,940,674 | A | 8/1999 | Sachs et al. |
| 6,423,255 | B1 | 7/2002 | Hoechsmann et al. |
| 6,875,097 | B2 | 5/2005 | Grundwald |
| 7,531,117 | B2 | 5/2009 | Ederer et al. |
| 7,537,446 | B2 | 5/2009 | James et al. |
| 9,630,249 | B2 | 4/2017 | Toyserkani et al. |
| 9,993,907 | B2 | 6/2018 | Murugesh et al. |
| 2001/0020448 | A1 | 9/2001 | Vaartstra et al. |
| 2004/0154533 | A1 | 8/2004 | Agarwal et al. |
| 2005/0110853 | A1 | 5/2005 | Gardner et al. |
| 2006/0019587 | A1 | 1/2006 | Deopura et al. |
| 2006/0052040 | A1 | 3/2006 | Prasad |
| 2006/0189269 | A1 | 8/2006 | Roy et al. |
| 2006/0192315 | A1 | 8/2006 | Farr et al. |
| 2007/0037486 | A1 | 2/2007 | Kang et al. |
| 2007/0093185 | A1 | 4/2007 | Naik |
| 2007/0128991 | A1 | 6/2007 | Yoon et al. |
| 2007/0235904 | A1 | 10/2007 | Saikin |
| 2008/0157436 | A1 | 7/2008 | Patel et al. |
| 2009/0093201 | A1 | 4/2009 | Kazuno et al. |
| 2009/0321979 | A1 | 12/2009 | Hiraide |
| 2010/0323050 | A1 | 12/2010 | Kumagai et al. |
| 2011/0059247 | A1 | 3/2011 | Kuzusako et al. |
| 2013/0017769 | A1 | 1/2013 | Kimura |
| 2013/0283700 | A1 | 10/2013 | Bajaj et al. |
| 2016/0354896 | A1 | 12/2016 | Lewis et al. |

FOREIGN PATENT DOCUMENTS

| | | |
|---|---|---|
| CN | 102712074 | 10/2012 |
| EP | 1320443 | 6/2003 |
| JP | 2002-028849 | 1/2002 |
| JP | 2006-291202 | 10/2006 |
| JP | 2007-049146 | 2/2007 |
| JP | 2008-207323 | 9/2008 |
| JP | 2008-546167 | 12/2008 |
| KR | 10-0303672 | 11/2001 |
| KR | 10-2005-0052876 | 6/2005 |
| KR | 10-2006-0045167 | 5/2006 |
| KR | 10-2007-0059846 | 6/2007 |
| KR | 10-2008-0038607 | 5/2008 |
| TW | 201141661 | 12/2011 |
| TW | 201350265 | 12/2013 |
| WO | WO 2013/162856 | 10/2013 |

OTHER PUBLICATIONS

International Search Report and Written Opinion in International Application No. PCT/US2014/061838, dated Jan. 27, 2015, 9 pages.
International Search Report and Written Opinion in International Application No. PCT/US2014/067097, dated Feb. 26, 2015, 13 pages.
'Wikipedia' [online]. "3D printing," 2013, [retrieved on Feb. 25, 2013]. Retrieved from the Internet: URL:http://en.wikipedia.org/wiki/3D_printing 17 pages.
Chinese Office Action in Chinese Application No. 201480073643.7, dated Jun. 5, 2018, 10 pages (see search report).
Japanese Office Action in Japanese Application No. 2016-541478, dated Jul. 31, 2018, 8 pages (English Translation).
CN Office Action in CN Application No. 201480073634.7, dated Jan. 31, 2019, 11 pages.
CN Office Action in CN Application No. 201480073634.7, dated Jul. 10, 2019, 8 pages.
CN Office Action in Chinese Application No. 201811339364.7, dated Aug. 31, 2020, 8 pages (with English translation).
JP office action in Japanese Application No. 2018-203950, dated Oct. 23, 2019 6 pages, (with English translation).
TW Office Action in Taiwanese Application No. 10820895360 dated Sep. 20, 2019, pages (with English Search Report).
Taiwan Office Action in Taiwan Application No. 103144118, dated Sep. 12, 2018, 11 pages (English Summary).

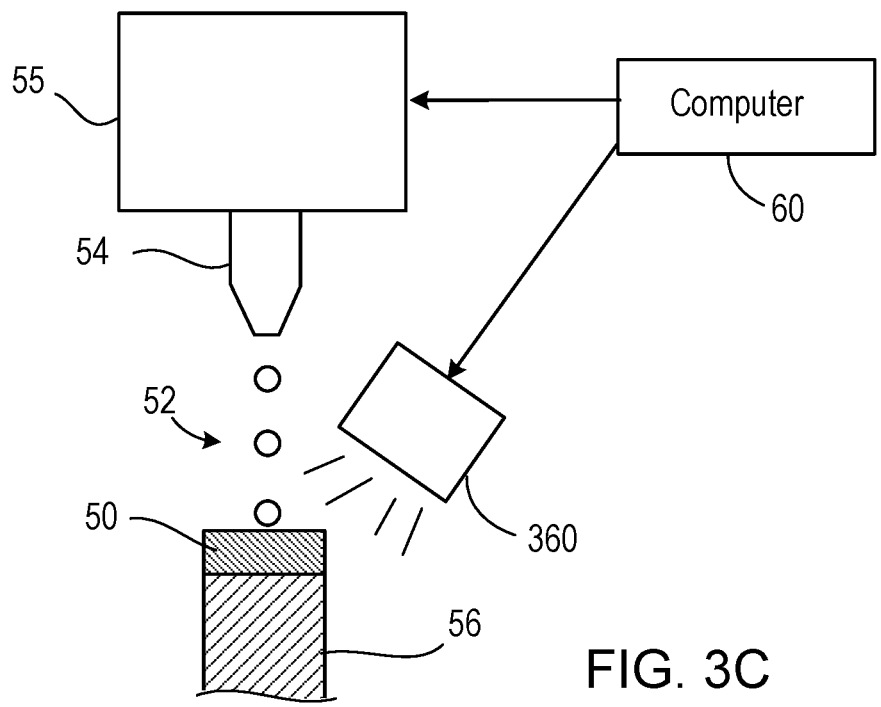
FIG. 3C
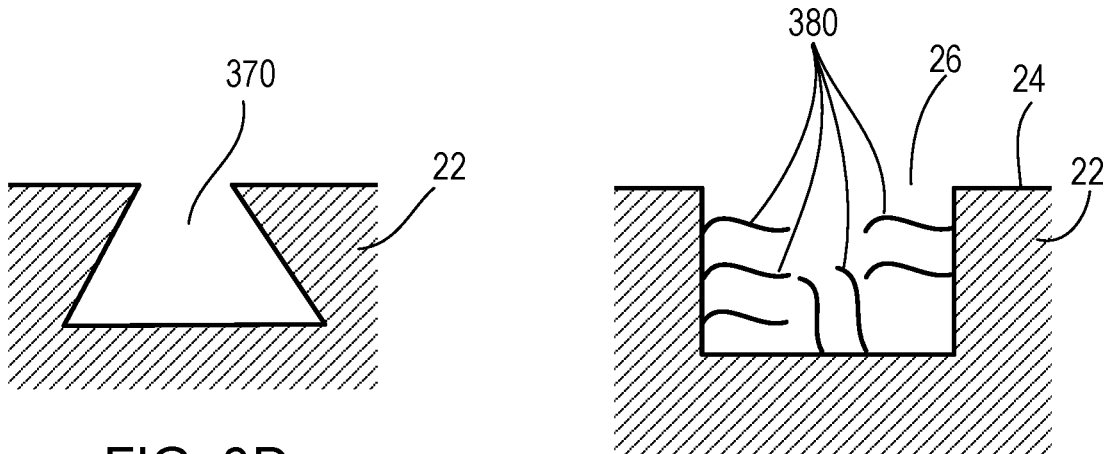
FIG. 3D
FIG. 3E

PRINTING CHEMICAL MECHANICAL POLISHING PAD HAVING WINDOW OR CONTROLLED POROSITY

CLAIM OF PRIORITY

This application is a continuation of U.S. application Ser. No. 14/549,443, filed on Nov. 20, 2014, which claims priority to U.S. Provisional Patent Application Ser. No. 61/919,578, filed on Dec. 20, 2013, the entire contents of which are hereby incorporated by reference.

TECHNICAL FIELD

This present invention relates to polishing pads used in chemical mechanical polishing.

BACKGROUND

An integrated circuit is typically formed on a substrate by the sequential deposition of conductive, semiconductive, or insulative layers on a silicon wafer. A variety of fabrication processes require planarization of a layer on the substrate. For example, for certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing liquid, such as slurry with abrasive particles, is typically supplied to the surface of the polishing layer.

One objective of a chemical mechanical polishing process is polishing uniformity. If different areas on the substrate are polished at different rates, then it is possible for some areas of the substrate to have too much material removed ("overpolishing") or too little material removed ("underpolishing").

Conventional polishing pads include "standard" pads and fixed-abrasive pads. A standard pad has a polyurethane polishing layer with a durable roughened surface, and can also include a compressible backing layer. In contrast, a fixed-abrasive pad has abrasive particles held in a containment media, and can be supported on a generally incompressible backing layer.

Polishing pads are typically made by molding, casting or sintering polyurethane materials. In the case molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

In addition to planarization, polishing pads can be used for finishing operations such as buffing.

SUMMARY

The material properties of the polishing pad have an effect on polishing. The porosity in the bulk of a polishing layer affects its compressibility, and the porosity at the surface of the polishing layer can contribute to slurry distribution. Porosity can be measured as the percentage volume of voids in the material.

Typically porosity in the polishing layer is introduced by including a material different from the pad material into the polishing pad. However, at the interface between the pad material and the different material, the differences in the hardness of the two materials can cause secondary scratches on a substrate that is being polished.

In some polishing layers, gas bubbles are injected into the liquid precursor to create voids. It is difficult to achieve uniform local distribution of gas bubbles, which can lead to differences in hardness across different regions of the polishing layer. The variations in pad hardness can impact the within-wafer uniformity of the polished substrate substrates. Conventionally, grooves are machined into the polishing layer to aid the transport of slurry along the polishing surface of the pad. However, the profiles of the grooves in the polishing layers are limited by the milling, lathing or machining processes. In addition, fibers of the polishing layer material may remain on the side of the groove after milling. These machining fibers may cause local resistance to the slurry flow.

3D printing allows better control of the distribution of pores in the polishing layer. Alternatively or in addition, 3D printing can be used to produce specific grooves profiles and/or reduce (e.g., eliminate) fibers within grooves that result from conventional machining of the polishing layer.

In one aspect, a method of fabricating a polishing pad includes determining a desired distribution of voids to be introduced within a polymer matrix of a polishing layer of the polishing pad, and generating electronic control signals configured to be read by a 3D printer. The control signals specify a plurality of first locations where a polymer matrix precursor is to be deposited, and specify a plurality of second locations corresponding to the desired distribution of voids where no material is to be deposited. A plurality of layers of the polymer matrix corresponding to the plurality of the first locations is successively deposited with the 3D printer, each layer of the plurality of layers of polymer matrix being deposited by ejecting the polymer matrix precursor from a nozzle. The polymer matrix precursor is solidified to form a solidified polymer matrix having the desired distribution of voids.

Implementations may include one or more of the following features.

Determining the desired distribution of voids may include determining one or more parameters selected from the group consisting of the size of the voids, and the spatial location of the voids within the polymer matrix.

The one or more parameters may be selected to compensate for different linear velocities of the polishing pad on a rotating polishing platen.

Printing on selected areas of the polishing layer may be performed to form grooves in a top surface of the polishing layer, wherein the grooves comprises regions where no polymer matrix precursor is deposited.

The grooves may have different depths across the top surface of the polishing layer.

The grooves may connect the distribution of voids in a first pattern to form a network of channels configured to transport slurry.

Solidifying the polymer matrix precursor may include curing the polymer matrix precursor in situ after it has been dispensed from the 3D printer and before the polymer matrix precursor is deposited at an adjoining position in the layer.

Curing the polymer matrix precursor may include ultraviolet (UV) or infrared (IR) curing.

The polymer matrix precursor may include a urethane monomer.

The solidified polymer matrix may include polyurethane.

A second desired distribution of voids to be introduced within a polymer matrix of a backing layer of the polishing pad may be determined.

The second desired distribution of voids in the polymer matrix of the backing layer may be different from the desired distribution of voids in the polishing layer of the polishing pad.

The second desired distribution of voids in the polymer matrix of the backing layer may have a higher density of voids such that the backing layer is more compressible than the polishing layer.

A material of the polymer matrix of the polishing layer may be different from a material of the polymer matrix of the backing layer.

A second plurality of layers may be successively deposited with the 3D printer to form the backing layer.

The polishing layer may be printed directly on the backing layer by the 3D printer without the use of an intermediate adhesive layer such that the polishing layer is bonded directed to the backing layer.

The voids may have dimension of between 30-50 microns.

In another aspect, a method of fabricating a polishing pad includes successively depositing a plurality of layers with a 3D printer, each layer of the plurality of polishing layers including a polishing material portion and a window portion, the polishing material portion deposited by ejecting a polishing material precursor from a first nozzle and solidifying the polishing material precursor to form a solidified polishing material, the window portion deposited by ejecting a window precursor from a second nozzle and solidifying the window precursor to form a solidified window.

Implementations may include one or more of the following features.

Curing of the polishing material precursor and the window precursor may form polymer matrixes having the same composition.

The polishing material precursor may include opacity-inducing additives and the window precursor may lack such additives.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3C is a schematic cross-sectional side view of an exemplary 3D printer having an in situ curing light source.

FIG. 3D is a schematic cross-sectional side view of a groove in an exemplary polishing layer.

FIG. 3E is a schematic cross-sectional side view of a groove having machining fibers in an exemplary polishing pad.

Like reference symbols in the various drawings indicate like elements.

DETAILED DESCRIPTION

Figure 1A:
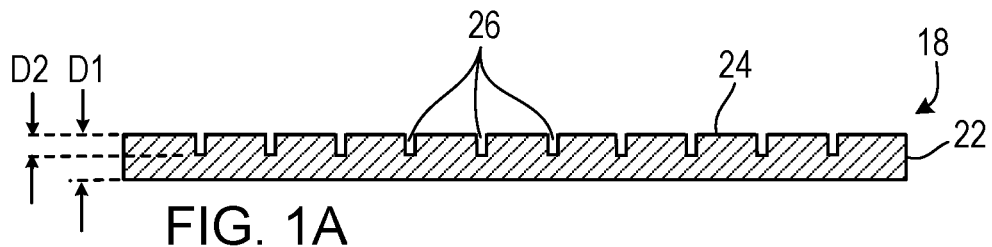
FIG. 1A is a schematic cross-sectional side view of an example polishing pad.
Figure 1B:
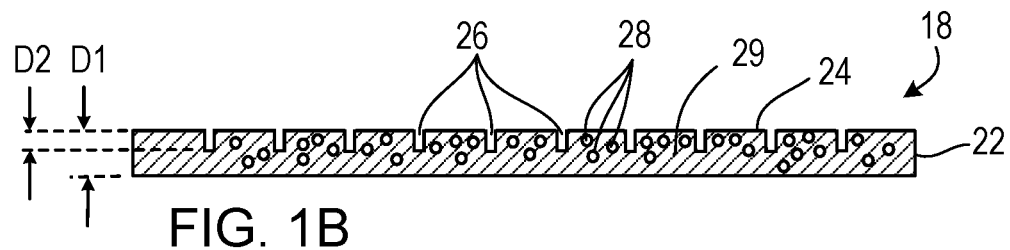
FIG. 1B is a schematic cross-sectional side view of another example polishing pad.
Figure 1C:
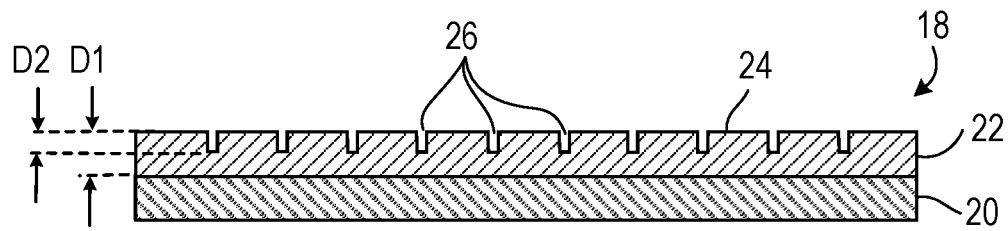
FIG. 1C is a schematic cross-sectional side view of yet another example polishing pad.

Referring to FIG. 1A-1C, a polishing pad 18 includes a polishing layer 22. As shown in FIG. 1A the polishing pad can be a single-layer pad that consists of the polishing layer 22, or as shown in FIG. 1C the polishing pad can be a multi-layer pad that includes the polishing layer 22 and at least one backing layer 20.

The polishing layer 22 can be a material that is inert in the polishing process. The material of the polishing layer 22 can be a plastic, e.g., a polyurethane. In some implementations the polishing layer 22 is a relative durable and hard material. For example, the polishing layer 22 can have a hardness of about 40 to 80, e.g., 50 to 65, on the Shore D scale.

As shown in FIG. 1A, the polishing layer 22 can be a layer of homogeneous composition, or as shown in FIG. 1B the polishing layer 22 can include abrasive particles 28 held in a matrix 29 of plastic material, e.g., polyurethane. The abrasive particles 28 are harder than the material of the matrix 29. The abrasive particles 28 can be from 0.05 wt % to 75 wt % of the polishing layer. For example, the abrasive particles 28 can be less than 1 wt % of the polishing layer 22, e.g., less than 0.1 wt %. Alternatively, the abrasive particles 28 can be greater than 10 wt % of the polishing layer 22, e.g., greater than 50 wt %. The material of the abrasive particles can be a metal oxide, such as ceria, alumina, silica or a combination thereof.

In some implementations, the polishing layer includes pores, e.g., small voids. The pores can be 50-100 microns wide.

The polishing layer 18 can have a thickness D1 of 80 mils or less, e.g., 50 mils or less, e.g., 25 mils or less. Because the conditioning process tends to wear away the cover layer, the thickness of the polishing layer 22 can be selected to provide the polishing pad 18 with a useful lifetime, e.g., 3000 polishing and conditioning cycles.

On a microscopic scale, the polishing surface 24 of the polishing layer 22 can have rough surface texture, e.g., 2-4 microns rms. For example, the polishing layer 22 can be subject to a grinding or conditioning process to generate the rough surface texture. In addition, 3D printing can provide small uniform features, e.g., down to 30 microns.

Although the polishing surface 24 can be rough on a microscopic scale, the polishing layer 22 can have good thickness uniformity on the macroscopic scale of the polishing pad itself (this uniformity refer to the global variation in height of the polishing surface 24 relative to the bottom surface of the polishing layer, and does not count any macroscopic grooves or perforations deliberately formed in the polishing layer). For example, the thickness non-uniformity can be less than 1 mil.

Optionally, at least a portion of the polishing surface 24 can include a plurality of grooves 26 formed therein for carrying slurry. The grooves 26 may be of nearly any pattern, such as concentric circles, straight lines, a cross-hatched, spirals, and the like. Assuming grooves are present, then the polishing surface 24, i.e., the plateaus between the grooves 26, can be about i.e., can be 25-90% of the total horizontal surface area of the polishing pad 22. Thus, the grooves 26 can occupy 10%-75% of the total horizontal surface area of the polishing pad 18. The plateaus between the grooves 26 can have a lateral width of about 0.1 to 2.5 mm.

In some implementations, e.g., if there is a backing layer 20, the grooves 26 can extend entirely through the polishing layer 22. In some implementations, the grooves 26 can extend through about 20-80%, e.g., 40%, of the thickness of the polishing layer 22. The depth of the grooves 26 can be 0.25 to 1 mm. For example, in a polishing pad 18 having a polishing layer 22 that is 50 mils thick, the grooves 26 can have a depth D2 of about 20 mils.

The backing layer 20 can be softer and more compressible than the polishing layer 22. The backing layer 20 can have a hardness of 80 or less on the Shore A scale, e.g., a hardness of about have a hardness of 60 Shore A. The backing layer 20 can be thicker or thinner or the same thickness as the polishing layer 22.

For example, the backing layer can be an open-cell or a closed-cell foam, such as polyurethane or polysilicone with voids, so that under pressure the cells collapse and the backing layer compresses. A suitable material for the backing layer is PORON 4701-30 from Rogers Corporation, in Rogers, Conn., or SUBA-IV from Rohm & Haas. The hardness of the backing layer can be adjusted by selection of the layer material and porosity. Alternatively, the backing layer 20 formed from the same precursor and have the same porosity as the polishing layer, but have a different degree of curing so as to have a different hardness.

Figure 2:
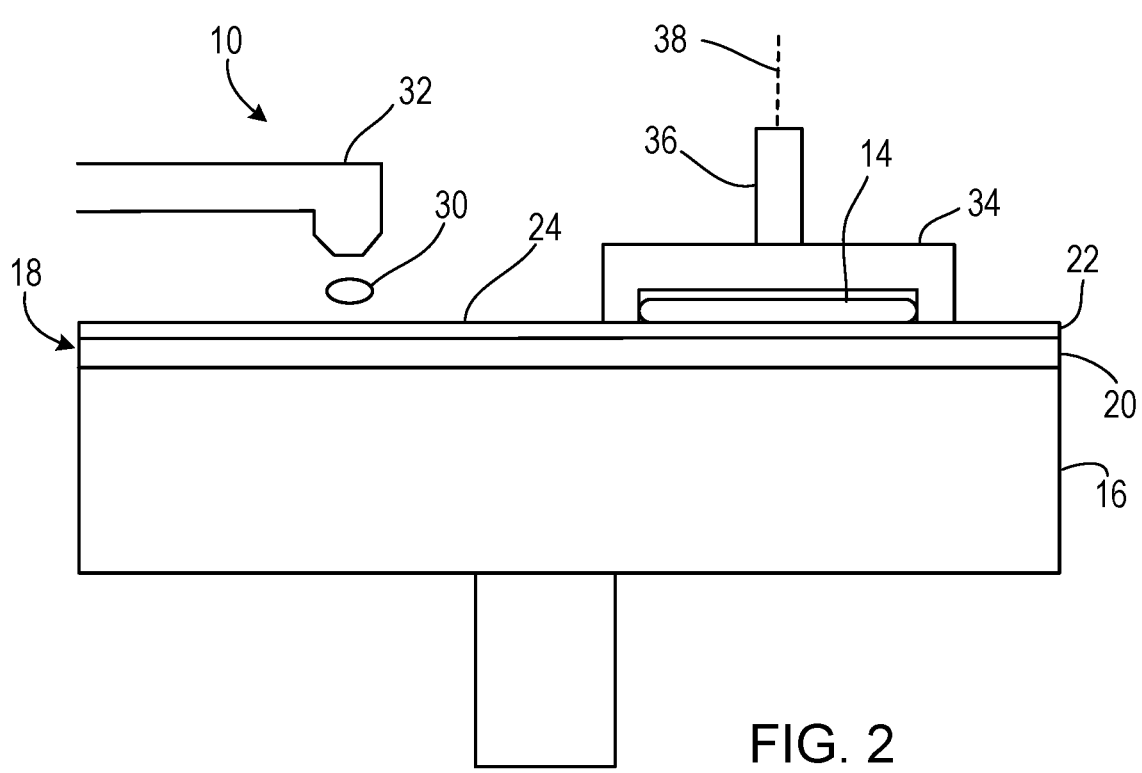
FIG. 2 is a schematic side view, partially cross-sectional, of a chemical mechanical polishing station.

Turning now to FIG. 2, one or more substrates 14 can be polished at a polishing station 10 of a CMP apparatus. A description of a suitable polishing apparatus can be found in U.S. Pat. No. 5,738,574, the entire disclosure of which is incorporated herein by reference.

The polishing station 10 can include a rotatable platen 16 on which is placed the polishing pad 18. During a polishing step, a polishing liquid 30, e.g., abrasive slurry, can be supplied to the surface of polishing pad 18 by a slurry supply port or combined slurry/rinse arm 32. The polishing liquid 30 can contain abrasive particles, a pH adjuster, or chemically active components.

The substrate 14 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38. The relative motion of the polishing pad 18 and the substrate 14 in the presence of the polishing liquid 30 results in polishing of the substrate 14.

Pad hardness and other material properties of the polishing layer have an effect on the polishing operation. Pad hardness is determined by the material used to fabricate the polishing layer, the extent and distribution of porosity in the polishing layer, and the degree of curing used to cure the polymer matrix precursor.

Control of the extent and distribution of porosity offers localized control of pad hardness. For example, it can be difficult to effectively vary the materials (that have different hardness) used to fabricate the polishing layer spatially across the polishing surface. Similarly, it can be difficult to control the degree of curing of the pad precursor with good resolution across the polishing layer. However, as described below, the location and density of pores can be controlled in a 3D printing process.

Typically porosity in the polishing layer 22 is introduced by including a material different from the polymer matrix precursor into the polishing layer. In some polishing pads, the porosity is introduced by including pore-containing (e.g., hollow) particles in the polishing layer. For example, hollow microspheres of known size can be mixed with the liquid precursor, which is then cured to form the material for the polishing layer. However, at the interface between the pad material and the particles, the differences in the hardness of the two materials can cause secondary scratches on the substrate that is being polished.

In some polishing layers, gas bubbles are used instead of particles to create voids. In this way, the need to use particles that are made of a material different from that of the polishing layer to create porosity is eliminated. While it is possible to control the overall porosity, it is difficult to control the pore size and distribution of pores when gas bubbles are used. Due to the somewhat random size and location of the gas bubbles, it is difficult to control the distribution of pores and the local porosity, and this can lead to differences in hardness across different regions of the polishing layer. For example, the diameter of the bubbles cannot be effectively controlled as the diameter is a function of the local surface tension. In addition, it is difficult to control the local distribution of gas bubbles, which can lead to differences in hardness across different regions of the polishing layer, causing variations in pad hardness that can impact the final polishing of wafers.

In some implementations, the polishing pad is manufactured to have a uniform distribution of pores.

In some implementations, the polishing pad is manufactured to have a distribution of pores that, due to the resulting differences in polishing layer hardness, is used to compensate for the differences in the linear velocity of the polishing pad being higher at the edge (near the circumference) of the polishing pad, compared to the center portion of the polishing pad. This difference in polishing speeds across the radius of the polishing pad, when uncorrected, can result in differential polishing of a substrate as the substrate is polished at different radial positions of the polishing layer.

In some implementations, the polishing pad is manufactured to have a distribution of pores that, due to the resulting differences in polishing layer hardness, compensate for other sources of non-uniformity in the polishing rate.

In order to effectively control the hardness of the polishing layer, computer simulations can first be used to determine the desired hardness of the polishing layer at different locations on the polishing layer. Such a simulation produces a hardness profile of the polishing layer that can be used to for example, compensate for differences in linear velocity of the polishing pad when it is being rotated. Based on the selected hardness profile, porosities are then distributed accordingly to achieve the selected profile. The size of the pores, the density and spatial distribution of the pores can be matched to the selected hardness profile.

Figure 3A:
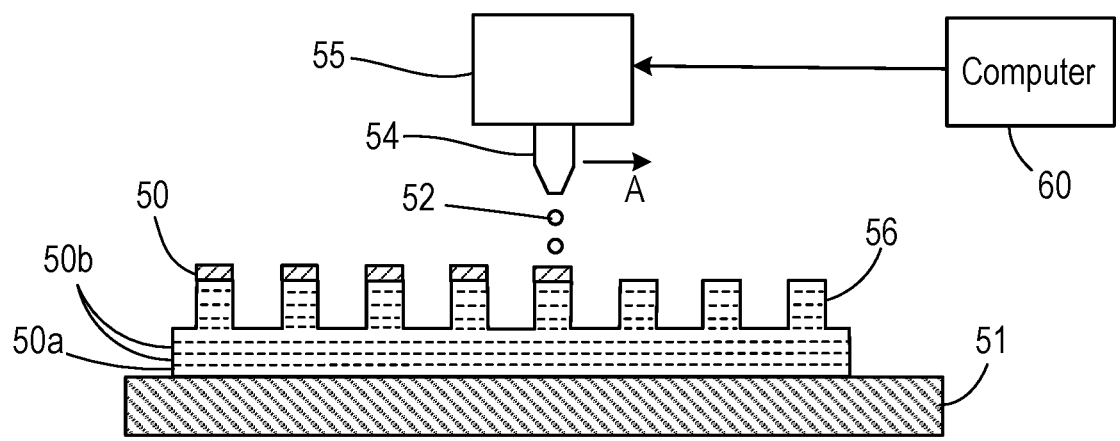
FIG. 3A is a schematic cross-sectional side view illustrating an exemplary 3D printer used to fabricate a polishing pad.

3D printing offers a convenient and highly controllable process for obtaining the porosities determined by computer simulations. Referring to FIG. 3A, at least the polishing layer 22 of the polishing pad 18 shown in FIGS. 1A-1C is manufactured using a 3D printing process. In the manufacturing process, thin layers of material are progressively deposited and fused. For example, droplets 52 of pad precursor material can be ejected from a nozzle 54 of a droplet ejecting printer 55 to form a layer 50. The droplet ejecting printer is similar to an inkjet printer, but uses the pad precursor material rather than ink. The nozzle 54 translates (shown by arrow A) across a support 51.

For a first layer 50a deposited, the nozzle 54 can eject onto the support 51. For subsequently deposited layers 50b, the nozzle 54 can eject onto the already solidified material 56. After each layer 50 is solidified, a new layer is then deposited over the previously deposited layer until the full 3-dimensional polishing layer 22 is fabricated. Each layer is applied by the nozzle 54 in a pattern stored in a 3D drawing computer program that runs on a computer 60.

The support 51 can be a rigid base, or be a flexible film, e.g., a layer of polytetrafluoroethylene (PTFE). If the support 51 is a film, then the support 51 can form a portion of the polishing pad 18. For example, the support 51 can be the backing layer 20 or a layer between the backing layer 20 and the polishing layer 22. Alternatively, the polishing layer 22 can be removed from the support 51.

A desired distribution of pores can simply be incorporated into the polishing layer 22 by not depositing the pad precursor material at particular locations specified by the desired distribution. That is, a pore can be formed at a particular location by simply not dispensing the pad precursor material at that particular location.

In 3D printing, the desired deposition pattern can be specified in a CAD-compatible file that is then read by an electronic controller (e.g., computer) that controls the printer. Electronic control signals are then sent to the printer to dispense the pad precursor material only when the nozzle 54 is translated to the position specified by the CAD-compatible file. In this way, the size of the actual pores in the polishing layer 22 does not need to be measured, but rather, the instructions contained in the CAD-file that are used to 3D print the material record the exact location and size of the porosity to be incorporated into the polishing layer 22.

Figure 3B:
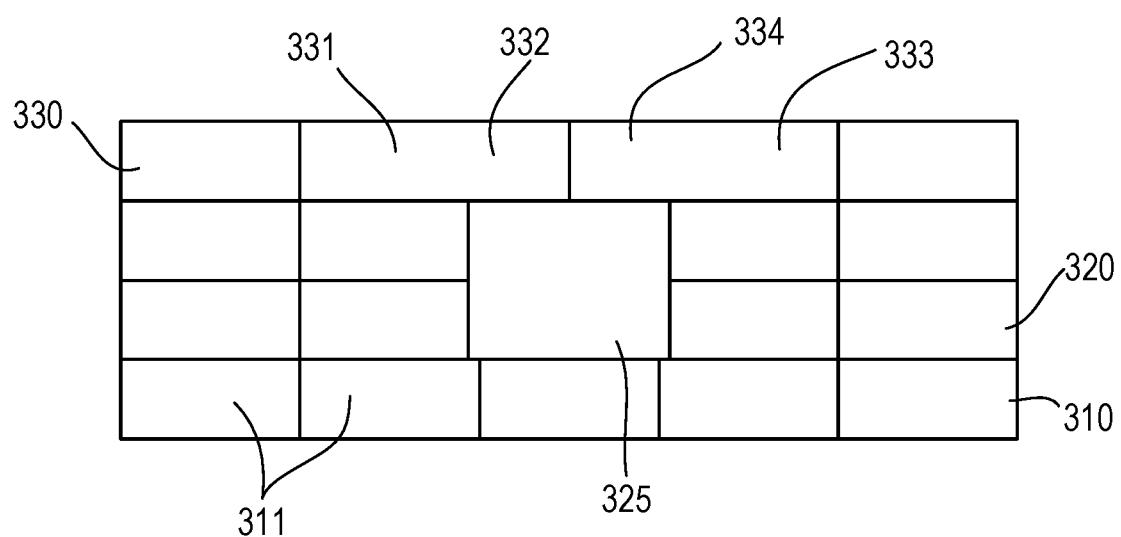
FIG. 3B is a schematic cross-sectional side view illustrating a polishing layer having a pore formed by 3D printing.

FIG. 3B shows a detailed view of a pore 325 that is formed by 3D printing. The nozzle 54 deposit a first layer 310 which is made up of a series of pad precursor portions 311 deposited at the resolution of the printer containing nozzle 54. Portions 311 are only schematically depicted in rectangular form. For a typical high speed printer having a resolution of, for example, 600 dots per inch (dpi), the width of each portion 311 (e.g., each pixel) can be between 30-50 microns.

After depositing the continuous first layer 310, nozzle 54 is used to deposit a second layer 320. The second layer 320 contains a void 325 where the nozzle 54 does not deposit any polymer matrix precursor. Pores of between 30-50 micron can be formed in the second layer 320 by simply not depositing materials at those locations.

The layer immediately above the portion having the void can develop an overhang 332 that is directly above the void 325 in the second layer 320. The overhang 332 is retained laterally by the surface tension of the deposited polymer matrix precursor portion 331, thus preventing the overhang 332 from collapsing into the void 325. The nozzle 54 then continues to deposit polymer matrix precursor portion 333 which includes an overhang 334 that extends above the void 325. Similar to overhang 332, the surface tension of the deposited polymer matrix precursor portion 333 prevents the overhang 332 from collapsing in to the void 325.

Each of the printed layers 310-330 can be 30-50 micron in thickness. FIG. 3B illustrates the void in rectangular shape, but in general, the pores in the polishing layer can be spherically shaped, or have other geometries such as cubic or pyramidal. The minimum size of the voids is determined by the resolution of the printer.

Alternatively, for pores close to the polishing surface of the pad having a pore surface that would be abraded during the polishing process, a fluid (e.g., water) that is compatible with the polishing process can be deposited into the void, e.g., by a second nozzle. The pad precursor material that is deposited above the void is not miscible with the fluid and is prevented from collapsing into the void by the presence of the fluid. During the polishing process, when a portion of the pore surface is abraded, the fluid that is used during the polishing process is released from the pore and the pore would have the compressibility of an unfilled pore.

An ultraviolet (UV) or infrared (IR) curable polymer can be used as the pad precursor material to fabricate the polishing layer, eliminating the need for an oven, required when polishing pads are manufactured using injection molding. The fabrication process of the polishing pad can be moved from the vendor site and be licensed directly to the customer to be used at the customer site, where the customer can manufacture the exact numbers of pads that is needed.

Solidification of the deposited pad precursor material can be accomplished by polymerization. For example, the layer 50 of pad precursor material can be a monomer, and the monomer can be polymerized in-situ by UV curing. For example, UV or IR light sources 360 can be positioned in close proximity to the nozzle 54, as illustrated in FIG. 3C. In this case, in situ curing can be performed immediately after the pad precursor material is dispensed from nozzle 54 so that the deposited material hardens upon deposition at the desired location in the polishing layer. In addition, the intensity of the UV or IR light sources can be adjusted so that the in situ curing occurs only to a degree sufficient to provide structural rigidity to the deposited pad precursor material. Alternatively, an entire layer 50 of pad precursor material can be deposited and then the entire layer 50 be cured simultaneously.

In addition to using pad precursor materials that are curable, the droplets 52 can be a polymer melt that solidifies upon cooling. Alternatively, the printer creates the polishing layer 22 by spreading a layer of powder and ejecting droplets of a binder material onto the layer of powder. In this case, the powder could include additives, e.g., the abrasive particles 22.

Grooves

Conventionally, grooves 26 formed in the polishing surface 24 for carrying slurry within the polishing surface 24 are typically machined. However, the profiles of such grooves are limited by milling, lathing or machining processes.

By using a 3D printing process, it is possible to create grooves with a wide variety of cross-sectional shapes. For example, it may be possible to create grooves which are narrower at the top than the bottom of the groove. For example, it would be difficult to achieve a dovetail profile 370, as shown in FIG. 3D, for the grooves.

Fibers 380 of the pad material may remain on the side of the groove 24 after milling, as shown in FIG. 3C. These machining fibers may cause local resistance to the slurry flow. 3D printing can reduce (e.g., eliminate) these fibers.

In addition, the pores can be interconnected in desired patterns with grooves to enhance slurry transport. Different depths of grooves can also be fabricated in the polishing layer.

Conventional pads include a hard covering layer (e.g., polishing layer 22) secured to a soft subpad (e.g., a backing layer 20) by a pressure sensitive adhesive (PSA). Using 3D printing, multi-layer polishing pads can be built in a single printing operation without the use of an adhesive layer, e.g., PSA. The backing layer 20 can be made by printing a different precursor polymer and/or using the same pad precursor polymer but increasing the porosity of the printed structure to allow the backing layer 20 to be softer than the polishing layer 22. Additionally, the backing layer 20 can be provided with a different hardness than the polishing layer 22 by using a different amount of curing, e.g., a different intensity of UV radiation.

A transparent window can be embedded within the polishing layer. An optical monitoring system can send and receive light beams through the transparent window to and from the layer on the substrate being polished polishing layer in order to more accurately determine the endpoint in the polishing of the substrate.

Instead of separately manufacturing the transparent window and then using adhesives or other techniques to secure the window into a corresponding aperture formed in the polishing layer, 3D printing allows the transparent window to be directly deposited into the polishing layer. For example, a second nozzle is used to dispense an optically clear material (e.g., transparent polymer precursors that are without opacity-inducing additives, e.g., hollow microspheres) used to fabricate the transparent window, while a first nozzle is used to dispense the pad precursor material having voids at specific positions to achieve the desired porosity. The interface between the transparent window material and the pad precursor is bonded directly during the printing process and no adhesive is needed. The window can be printed to be uniformly solid, e.g., without porosity.

The 3D printing approach allows tight tolerances to be achieved due to the layer-by-layer printing approach. Also, one printing system (with printer 55 and computer 60) can be used to manufacture a variety of different polishing pads having different desired distributions of porosity in the polishing layer, simply by changing the pattern stored in the 3D drawing computer program.

Besides tailoring the porosity distribution in a polishing pad used for CMP, the methods and apparatus described herein can also be used to control size of porosity and the distribution of porosity for shock absorption, sound dampening and the controller thermal management of parts.

A number of implementations have been described. Nevertheless, it will be understood that various modifications may be made. For example, either the polishing pad, or the carrier head, or both can move to provide relative motion between the polishing surface and the substrate. The polishing pad can be a circular or some other shape. An adhesive layer can be applied to the bottom surface of the polishing pad to secure the pad to the platen, and the adhesive layer can be covered by a removable liner before the polishing pad is placed on the platen. In addition, although terms of vertical positioning are used, it should be understood that the polishing surface and substrate could be held upside down, in a vertical orientation, or in some other orientation.

What is claimed is:

1. A method of fabricating a polishing pad, comprising:
    receiving data indicating a desired distribution of pores to be included within a polymer matrix of a polishing layer of the polishing pad; and
    successively depositing a plurality of layers to form the polishing layer using additive manufacturing, wherein depositing the plurality of layers includes
        for a first layer of the plurality of layers, ejecting droplets of a polymer matrix precursor onto a first plurality of locations on an underlying layer,
        for the first layer, ejecting droplets of a fluid onto or more second locations on the underlying layer, the one or more second locations corresponding to one or more pores of the desired distribution of pores,
        for the first layer, solidifying the polymer matrix precursor to form a solidified polymer matrix of the first layer,
        for a second layer of the plurality of layers that is deposited onto the first layer, ejecting droplets of the polymer matrix precursor over the fluid in the one or more pores, wherein the fluid blocks the polymer matrix precursor of the second layer from filling the one or more pores, and
        for the second layer, solidifying the polymer matrix precursor to form a solidified polymer matrix of the second layer that extends over the one or more pores with the fluid in the pores.

2. The method of claim 1, wherein ejecting droplets of the polymer matrix precursor comprises ejecting droplets from a first nozzle of a 3D printing system over a support, and ejecting droplets of the fluid comprises ejecting droplets from a second nozzle of the 3D printing system.

3. The method of claim 1, comprising curing the polymer matrix precursor in situ in a layer after the polymer matrix precursor has been dispensed and before polymer matrix precursor is deposited at a subsequent position in the layer.

4. The method of claim 1, wherein the polymer matrix precursor comprises a urethane monomer and the solidified polymer matrix comprises polyurethane.

5. The method of claim 1, wherein solidifying the polymer matrix precursor comprises curing the polymer matrix precursor with light.

6. The method of claim 5, wherein the light comprises UV light.

7. The method of claim 2, comprising translating the first nozzle across the support.

8. The method of claim 1, wherein each layer of the plurality of layers has a thickness of 30-50 microns.

9. The method of claim 1, wherein the pores have dimensions of 30-50 microns.

10. The method of claim 1, comprising curing an entire layer of the polymer matrix precursor simultaneously.

11. The method of claim 1, wherein the fluid is water.

12. The method of claim 1, wherein the polymer matrix precursor and the fluid are immiscible.

* * * * *